United States Patent
Hammons

(10) Patent No.: US 8,727,319 B2
(45) Date of Patent: May 20, 2014

(54) SYSTEM AND METHOD FOR INSTALLING FIBER OPTIC CABLE

(71) Applicant: Daniel Hammons, Joshua, TX (US)

(72) Inventor: Daniel Hammons, Joshua, TX (US)

( * ) Notice: Subject to any disclaimer, the term of this patent is extended or adjusted under 35 U.S.C. 154(b) by 0 days.

(21) Appl. No.: 13/973,386

(22) Filed: Aug. 22, 2013

(65) Prior Publication Data

US 2013/0334478 A1 Dec. 19, 2013

Related U.S. Application Data

(63) Continuation of application No. 12/409,755, filed on Mar. 24, 2009, now Pat. No. 8,517,344.

(60) Provisional application No. 61/040,571, filed on Mar. 28, 2008.

(51) Int. Cl.
| | | |
|---|---|---|
| *B66F 3/00* | (2006.01) | |
| *B65H 59/00* | (2006.01) | |
| *E21C 29/16* | (2006.01) | |
| *H02G 1/08* | (2006.01) | |
| *F16C 1/16* | (2006.01) | |
| *G02B 6/46* | (2006.01) | |

(52) U.S. Cl.
USPC .................. 254/134; 254/134.4; 74/502.2

(58) Field of Classification Search
USPC .......................................... 254/134
See application file for complete search history.

(56) References Cited

U.S. PATENT DOCUMENTS

| | | | | |
|---|---|---|---|---|
| 3,767,007 | A * | 10/1973 | Garnett | ............ 182/2.5 |
| 4,077,610 | A | 3/1978 | Masuda | |
| 4,261,220 | A * | 4/1981 | Gill | .............. 74/502.2 |
| 4,475,715 | A | 10/1984 | Asplin, Sr. | |
| 4,526,057 | A * | 7/1985 | Mochida et al. | ............. 74/502.2 |
| 4,529,148 | A * | 7/1985 | Hesprich et al. | .............. 242/159 |
| 4,596,381 | A | 6/1986 | Hamrick | |
| 4,684,211 | A * | 8/1987 | Weber et al. | .................. 385/136 |
| 4,804,245 | A | 2/1989 | Katayose et al. | |
| 5,013,125 | A | 5/1991 | Nilsson et al. | |
| 5,052,778 | A | 10/1991 | Jamshid | |
| 5,082,338 | A | 1/1992 | Hodge | |
| 5,096,163 | A | 3/1992 | Swearingen | |
| 5,121,644 | A | 6/1992 | Grey et al. | |
| 5,129,027 | A | 7/1992 | Boero et al. | |

(Continued)

OTHER PUBLICATIONS

Jet Line, high-strength polypropylene made of continuous monofilament fibers, website www.pullingrope.com/jet_line.html, Mar. 28, 2008, 1 page.

(Continued)

*Primary Examiner* — Lee D Wilson
*Assistant Examiner* — Alvin Grant
(74) *Attorney, Agent, or Firm* — Geoffrey A. Mantooth

(57) ABSTRACT

A system includes a device, such as a streetlight or a signal light, having one or more conduits extending therefrom. An electrical conductor extends through the conduit and is connected to the light. The conduit also has a fiber optic cable extending therethrough, installed by way of a rod assembly inserted into one end of the conduit and a tool inserted into another end of the conduit. The ends of the rod assembly and the tool engage one another in the conduit and allow one of the tool or the rod assembly to be withdrawn from the conduit, withdrawing the other. The fiber optic cable is coupled thereto and extended through the conduit.

13 Claims, 9 Drawing Sheets

(56) References Cited

U.S. PATENT DOCUMENTS

| | | | |
|---|---|---|---|
| 5,137,306 A | 8/1992 | Flood | |
| 5,374,034 A | 12/1994 | Flores, Sr. et al. | |
| 5,480,203 A | 1/1996 | Favalora et al. | |
| 6,066,397 A | 5/2000 | Risch et al. | |
| 6,210,802 B1 | 4/2001 | Risch et al. | |
| 6,244,261 B1 | 6/2001 | West, Jr. | |
| 6,357,933 B1 | 3/2002 | Bradley et al. | |
| 6,719,461 B2 | 4/2004 | Cull | |
| 6,811,307 B2 * | 11/2004 | Crowe et al. | 374/131 |
| 7,100,274 B2 * | 9/2006 | Sylvia et al. | 29/819 |
| 7,374,149 B1 | 5/2008 | Dacey | |
| 7,621,505 B2 | 11/2009 | Hamrick | |
| 8,259,708 B2 | 9/2012 | Cotton et al. | |
| 8,408,520 B2 * | 4/2013 | Jordan et al. | 254/134 |
| 8,517,344 B2 * | 8/2013 | Hammons | 254/134 |
| 2001/0033730 A1 | 10/2001 | Fentress | |
| 2003/0146423 A1 * | 8/2003 | Griffioen et al. | 254/134.4 |
| 2003/0183813 A1 * | 10/2003 | Humphrey | 254/134.3 FT |
| 2004/0065444 A1 | 4/2004 | Smith et al. | |
| 2004/0234215 A1 | 11/2004 | Serrano et al. | |
| 2006/0284148 A1 | 12/2006 | Watkins | |
| 2008/0011990 A1 * | 1/2008 | Kostet et al. | 254/134 |
| 2009/0057628 A1 * | 3/2009 | Allen | 254/134.3 R |
| 2009/0245738 A1 | 10/2009 | Hammons | |
| 2009/0265042 A1 | 10/2009 | Mollenkopf et al. | |
| 2010/0202748 A1 | 8/2010 | Pierce et al. | |
| 2010/0277720 A1 | 11/2010 | Hammons | |
| 2011/0064371 A1 | 3/2011 | Leatherman et al. | |
| 2011/0221603 A1 | 9/2011 | Deaver, Sr. et al. | |

OTHER PUBLICATIONS

Push Pull Rods, website www.pushpullrods.com, Mar. 28, 2008, 2 pages.

Pull Tapes and Ropes, website www.nettechdi.com/pull_tape.htm?gclid+CLbqppffsJICFQJLxwodhln8RA, Mar. 28, 2008, 2 pages.

Duct Rods, Duct Rodders.Com Store, website www.ductrodders.com, Mar. 28, 2008, 2 pages.

Braided Ropes, website www.pullingrope.com/braided_rope.html, Mar. 28, 2008, 1 page.

* cited by examiner

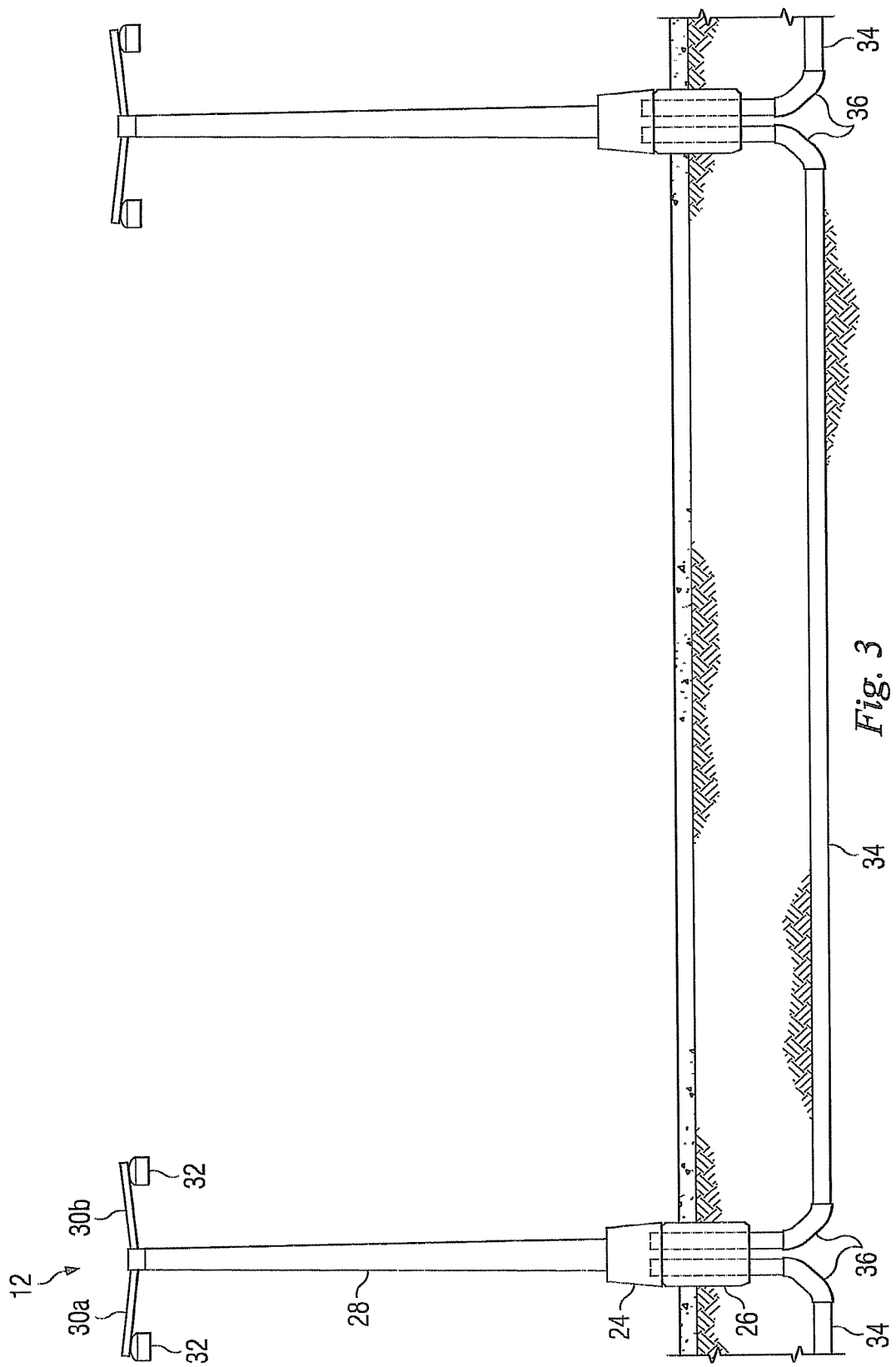

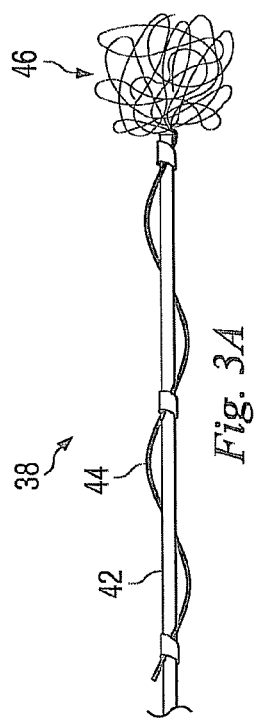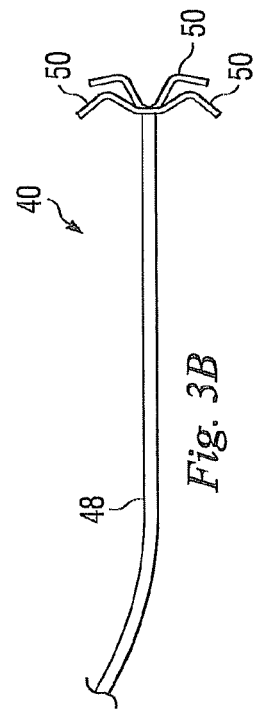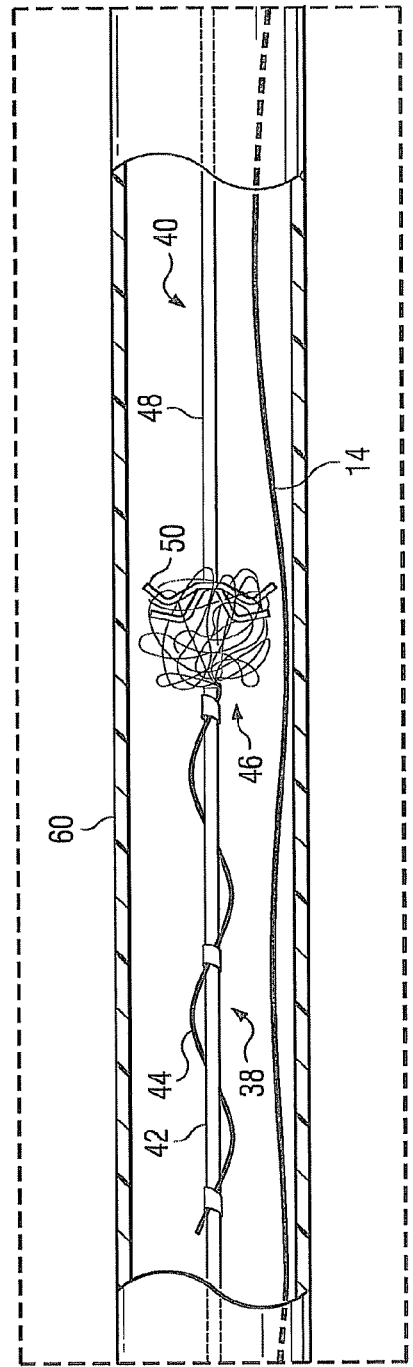

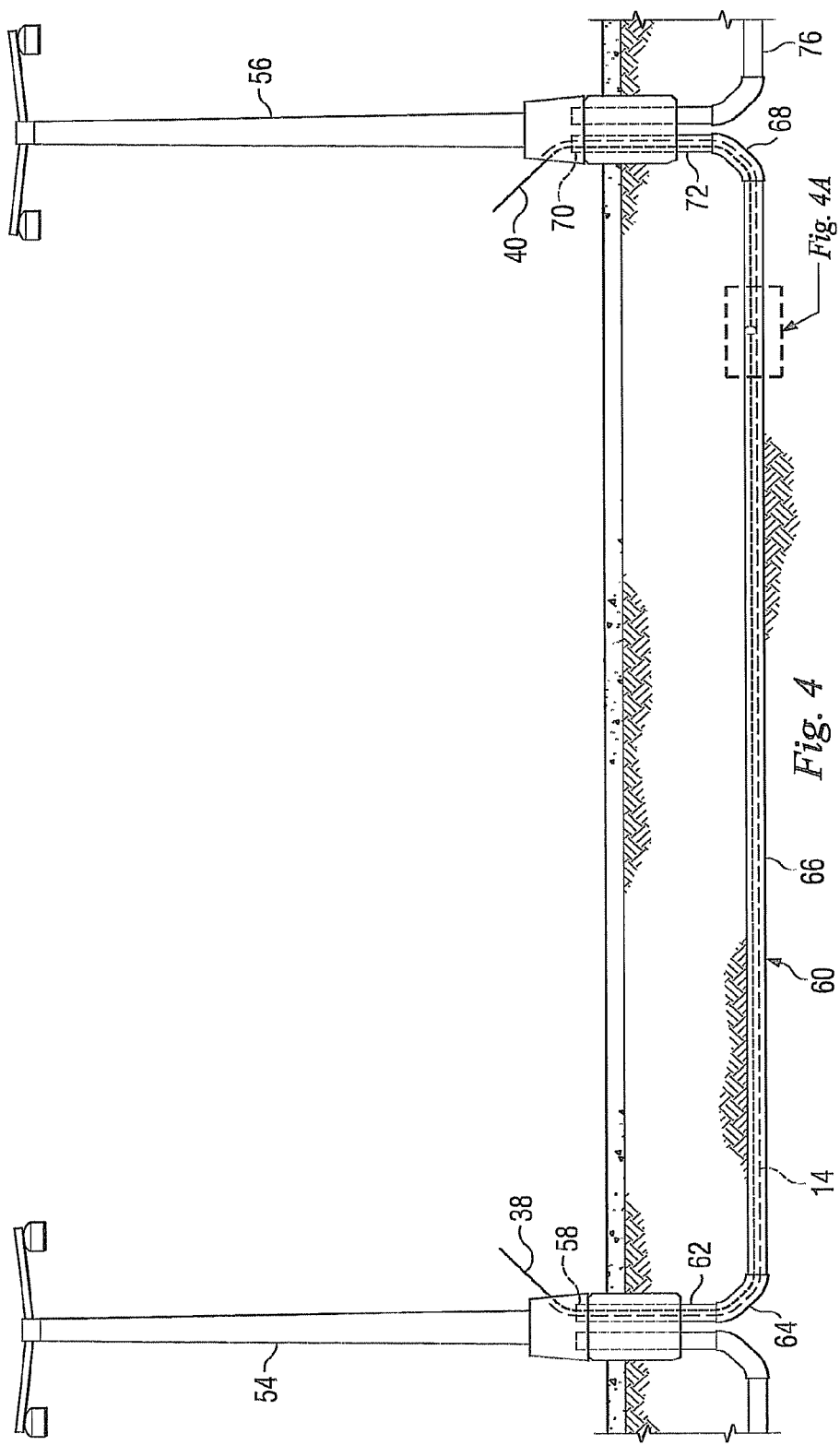

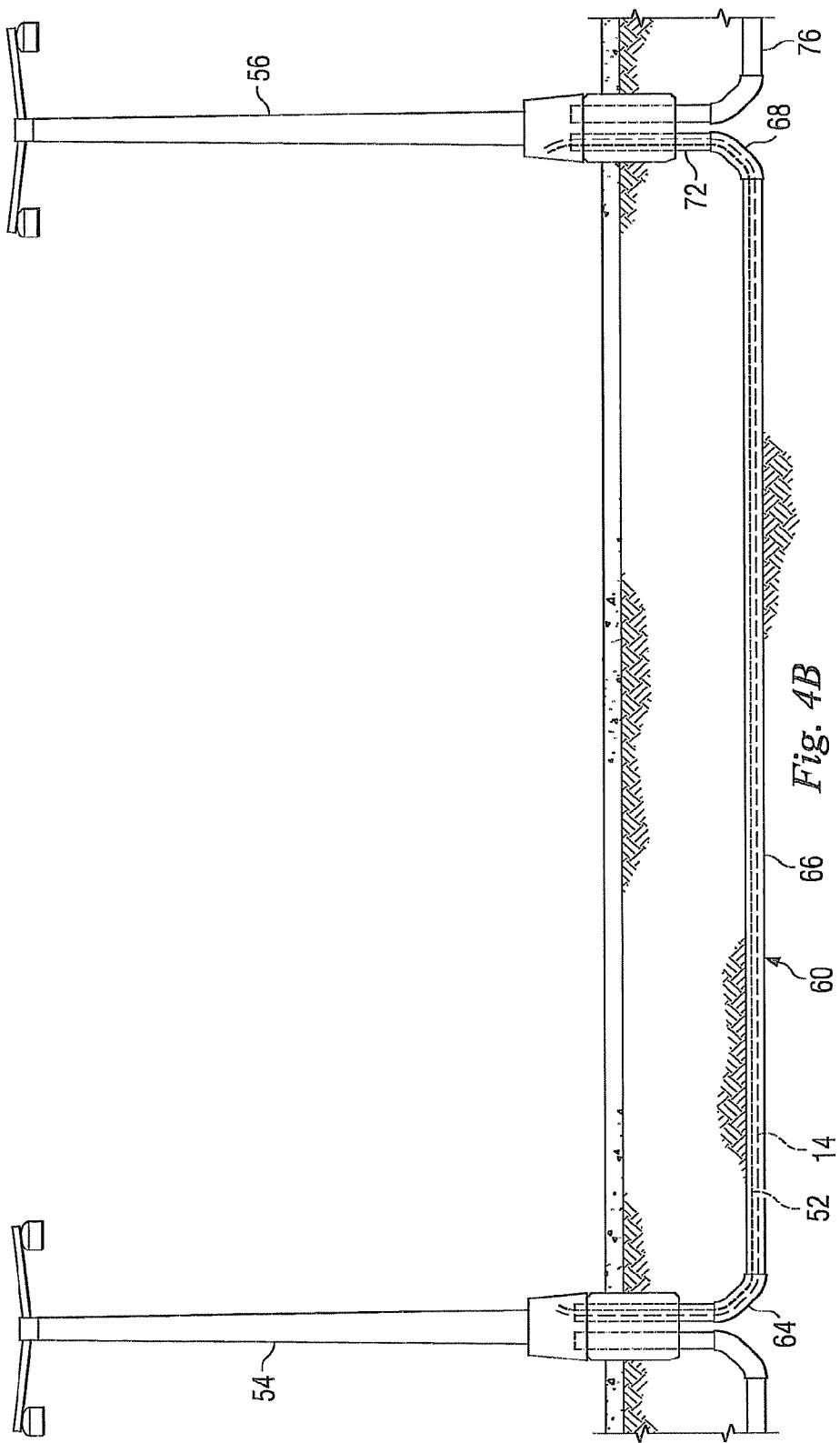

SYSTEM AND METHOD FOR INSTALLING FIBER OPTIC CABLE

CROSS REFERENCE TO RELATED APPLICATIONS

This application claims the benefit of the filing date of U.S. patent application No. 61/040,571, filed Mar. 28, 2008, and application Ser. No. 12/409,755, filed Mar. 24, 2009, the disclosure of which is incorporated herein by reference.

FIELD OF THE INVENTION

Embodiments of the present invention relate to a system and method for installing fiber optic cable in existing streetlight conduit.

BACKGROUND OF THE INVENTION

Municipalities such as cities and states are increasingly having underground fiber optic cable systems installed for purposes of providing access to high speed wireless internet services as well as to enable continuous and comprehensive surveillance for traffic safety as well as for personal security. Common techniques utilized for installing such fiber optic cable have conventionally required the digging of a trench typically in an existing street or pedestrian surface, laying conduit and then running the fiber optic cable in the conduit. Such conventional practices are labor-intensive, time-consuming and disruptive to vehicular and pedestrian traffic. In addition, after the conduit and cable are laid and the trench is refilled, the street or pedestrian surface covering the trench is prone to subsidence and undesirable surface irregularities.

BRIEF DESCRIPTION OF THE DRAWINGS

Aspects of the present disclosure are best understood from the following detailed description when read with the accompanying figures. It is emphasized that various features are not drawn to scale. In fact, the dimensions of the various features may be arbitrarily increased or reduced for clarity of discussion.

FIG. 3 is a schematic view of two adjacent streetlights interconnected by subterranean conduit;

FIG. 3A is a schematic view of a push rod assembly used in proofing the system for installing fiber optic cable according to the present invention in which the push rod assembly has a bunched end including one or more loops and/or bends of line disposed at the leading end thereof;

FIG. 3B is a schematic view of a fishing tool used in proofing the system for installing fiber optic cable according to the present invention in which the fishing tool has a tip with plastic hooks which are designed to catch the bunched end of line on the leading end of the push rod assembly;

FIG. 4 is a schematic view of two adjacent streetlights interconnected by subterranean conduit showing a push rod assembly and a fishing tool disposed within the conduit;

FIG. 4A is an enlarged view of a portion of the view shown in FIG. 4;

FIG. 4B is a view similar to that of FIG. 4 but showing fiber optic cable disposed within the conduit;

DETAILED DESCRIPTION

Figure 1:
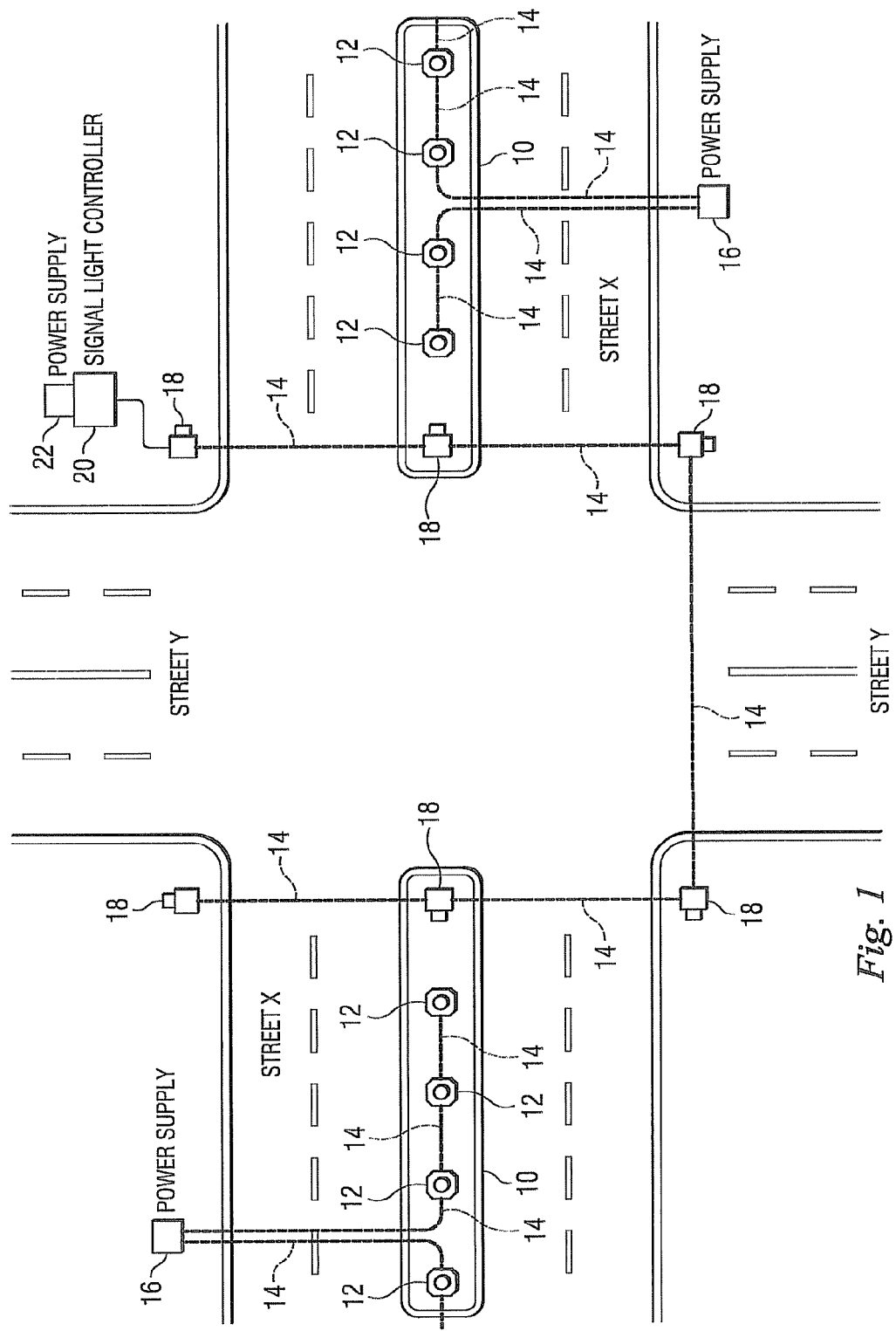
FIG. 1 is a schematic view of the system for installing fiber optic cable according to the present invention in which fiber optic cable is run in existing streetlight conduit.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity, and does not in itself dictate a relationship between the various embodiments and/or configurations discussed.

Figure 2:
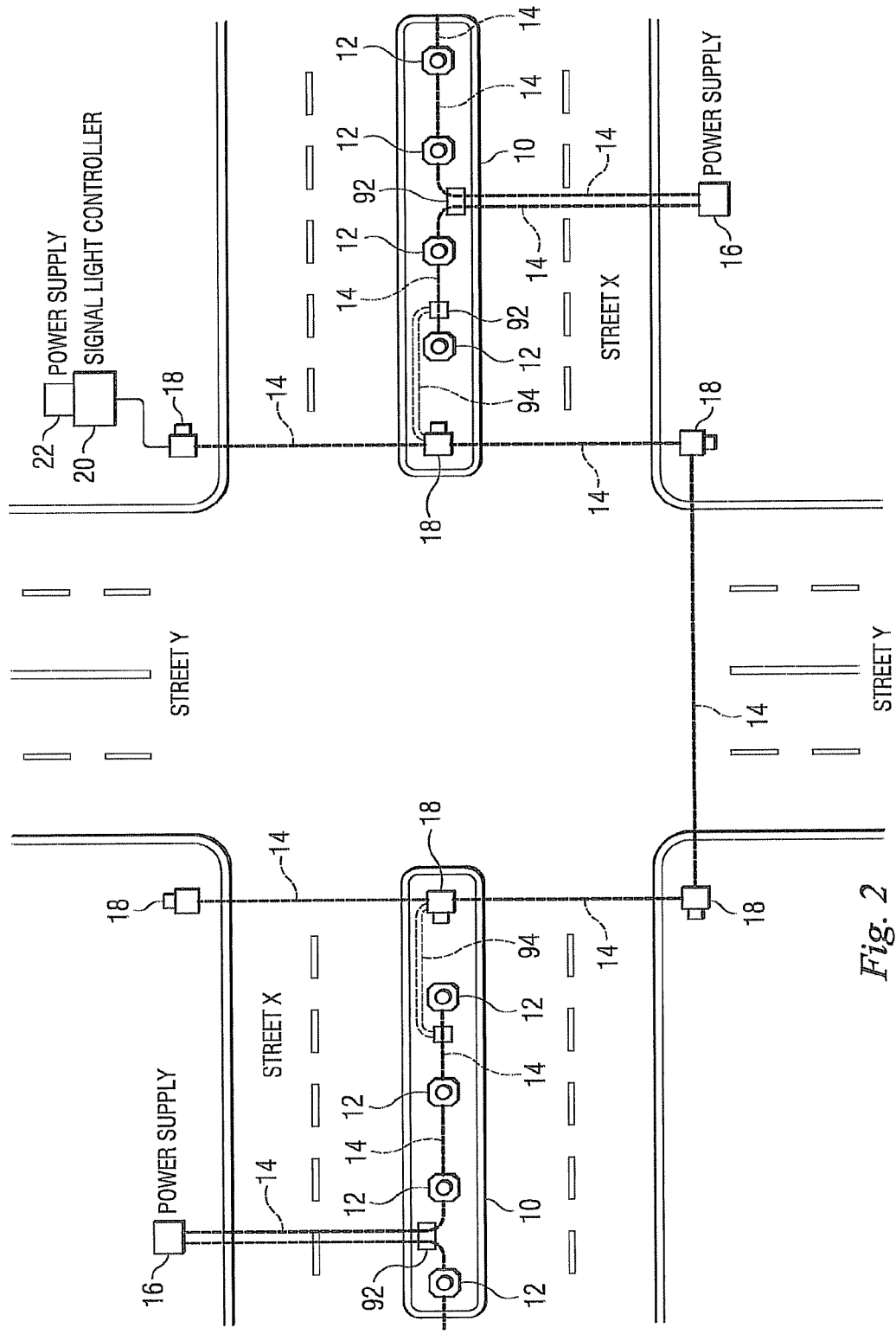
FIG. 2 is a schematic view of the system for installing fiber optic cable according to the present invention in which fiber optic cable is run in existing streetlight and signal light conduit.

Embodiments of the present include a method and system for installing fiber optic\cable in existing streetlight and signal light conduit. Referring to FIGS. 1 and 2, a typical intersection between streets X and Y is shown in which street X includes median strips 10 with streetlights 12 extending vertically from the median strips 10. The streetlights 12 in each median strip 10 are connected with electrical conductors 14 to an electric power supply 16. The streetlights 12 in each median strip 10 together with the electrical conductors 14 and the power supply 16 typically form a self-contained circuit such that streetlights 12 in adjacent median strips 10 are not connected. Typically, the streetlights 12 are spaced apart by about 200 feet.

Also, as shown in FIGS. 1 and 2, the intersection between streets X and Y includes traffic signals 18 for controlling the flow of traffic traveling on streets X and Y. The traffic signals 18 are connected with electrical conductors 14 to a signal light controller 20 which is in turn connected to a power supply 22. The traffic signals 18 together with the electrical conductors 14 and the power supply 22 typically form a self-contained circuit such that the traffic signals 18 are not connected to the proximately located streetlights 12.

As shown in FIG. 3 with continuing reference to FIGS. 1 and 2, each streetlight 12 typically includes a davit 24 with a door (not shown) which is mounted on a base 26 which is typically made of concrete and is located at and below ground level. A pole 28 extends vertically from the davit 24 and branches into two diametrically opposed arms 30a, 30b at the highest elevation of the pole 28 above the base 26. Light fixtures 32 are then fixed to the ends of opposed arms 30a, 30b. As further shown in FIG. 3, conduit 34 extends between adjacent streetlights 12 and is typically located below grade. In typical fashion, the conduit 34 runs horizontally between streetlights 12 and then makes a 90 degree turn at elbow 36 so as to travel upward through the base 26 and terminate within the davit 24. Those of ordinary skill in the art will recognize that the conduit 34 may take any suitable form such as polyvinylchloride ("PVC") pipe in any suitable size such as 2 inch diameter pipe which is typical for streetlight conduit which houses #2 down to #8 conductors depending upon application or 4 inch diameter pipe which is typical for signal light conduit which houses large conductors. Those of ordinary skill in the art will also recognize that the electrical conductors 14 extend through the conduit 34 to connect adjacent streetlights 12 and to connect the streetlights 12 to the power supply 16.

Although not shown in the drawings, those of ordinary skill in the art will recognize that electrical conductors 14 extend through conduit to connect the traffic signals 18 to a signal light controller 20 and a power supply 22.

Referring now to FIGS. 3A and 3B with continuing reference to FIGS. 1, 2 and 3, the method for installing fiber optic cable of the present invention is implemented with tools, such as a push rod assembly 38 (also referred to as a rod assembly) and a fishing tool 40. In an exemplary embodiment, the push rod assembly 38 is composed of one or more non-conductive materials. In an exemplary embodiment, the push rod assembly 38 includes a non-conductive rod 42 having a suitable diameter for passage through conduit 34 without the necessity of removing electrical conductors 14. For instance, for typical streetlight conduit 34 having a 2 inch diameter and for typical signal light conduit having a 4 inch diameter, the rod 42 may have a diameter of $3/8$ inches. Those of ordinary skill in the art will understand that the length of the push rod assembly 38 is any suitable length, such as 400 feet, sufficient to extend for the full run of conduit 34 between any two items such as streetlights 12 and traffic signals 18. As shown in FIG. 3A, a line 44 is connected to the rod 42 by any suitable means such as by knotting or taping the line 44 about the circumference of the rod 42. In addition, a bunched end 46 including one or more loops and/or bends is created in one end of the line 44 and disposed at the leading end of the push rod assembly 38. The bunched end 46 is created by folding and wrapping an end of the line 44 in a random manner to form a mass of the line 44 that has a volume that is many times the diameter of the rod 42 and that is extremely flexible so as to fit within the inside diameter of conduit 34. In an exemplary embodiment, the line 44 is jet line. In an exemplary embodiment, the line 44 is composed of at least high-strength polypropylene made of continuous monofilament fibers. In an exemplary embodiment, the line 44 is composed of braided or woven nylon threads. In an exemplary embodiment, the rod 42 is composed of fiberglass. In an exemplary embodiment, instead of, or in addition to fiberglass, the rod 42 is composed of one or more other types of non-conductive materials. In several exemplary embodiments, instead of, or in addition to polypropylene, nylon, fiber-glass and/or any combination thereof, the push rod assembly 38 is composed of one or more other types of non-conductive materials.

The fishing tool 40 shown in FIG. 3B, includes a rod 48 having a suitable diameter for passage through conduit 34 without the necessity of removing electrical conductors 14. For instance, for typical streetlight conduit 34 having a 2 inch diameter and for typical signal light conduit having a 4 inch diameter, the rod 48 may have a diameter of $1/4$ inches. Those of ordinary skill in the art will understand that the length of the fishing tool 40 is any suitable length, such as 10 feet, sufficient to extend into conduit 34 and come into contact with the bunched end 46 disposed at the leading end of the push rod assembly 38. The fishing tool 40 also includes hooks 50 which are connected to the rod 48 by any suitable means such as glue or thermal bonding. In an exemplary embodiment, the rod 48 is composed of one or more non-conductive materials. In an exemplary embodiment, the rod 48 is composed of non-conductive fiberglass. In an exemplary embodiment, the hooks 50 are plastic hooks. In an exemplary embodiment, instead of, or in addition to plastic, the hooks 50 are composed of one or more other types of non-conductive materials. In several exemplary embodiments, instead of, or in addition to non-conductive fiberglass and/or plastic, the fishing tool 40 is composed of one or more other types of non-conductive materials.

In operation and as shown schematically in FIGS. 4, 4A and 4B with continuing reference to FIGS. 1, 2, 3, 3A and 3B, to run fiber optic cable 52 from adjacent streetlight poles 54 and 56, the leading end of the push rod assembly 38 is inserted into a first end 58 of conduit 60 which extends between the streetlights 54 and 56. The insertion of the push rod assembly 38 into the conduit 60 is continued so that the leading end of the push rod assembly 38 is pushed through a vertical portion 62 of the conduit 60, past an elbow 64 and through substantially a horizontal portion 66 of the conduit 60 until it reaches an elbow 68 beneath the streetlight 56.

Next, the leading end of fishing tool 40 bearing the plastic hooks 50 is inserted into a second end 70 of the conduit 60. The insertion of the fishing tool 40 into the conduit 60 is continued so that the leading end of the fishing tool 40 is pushed through a vertical portion 72 of the conduit 60, past an elbow 68 and into the horizontal portion 66 of conduit 60 until the plastic hooks 50 of the fishing tool 40 come into contact with and become entangled in the bunched end 46 located at the leading end of the push rod assembly 38, as shown most clearly in FIG. 4A.

The fishing tool 40 is then withdrawn from the conduit 60 causing the leading end of the push rod assembly 38 to be pulled through the elbow 68 and the vertical portion 72 so that it exits the second end 70 of the conduit 60. An end of the fiber optic cable 52 is then attached to the leading end of the push rod assembly 38 and the push rod assembly 38 is withdrawn from the first end 58 of the conduit 60 causing the fiber optic cable 52 to enter the second end 70 of the conduit, passing through the vertical potion 72, the elbow 68, the horizontal portion 66, the elbow 64 and the vertical portion 62 so that it exits the first end 58 of the conduit 60, as shown in FIG. 4B. As a result, the fiber optic cable 52 is disposed within, extending through the conduit 60 and between the streetlights 54 and 56. As a result, the fiber optic cable 52 is able to be installed and run without creating new trenches and/or performing any appreciable digging, thereby generally eliminating any disruption to vehicular and pedestrian traffic in the vicinity of the streetlights 54 and 56, and generally reducing the amount of labor and time required to install and run the cable 52. In an exemplary embodiment, instead of attaching the end of the fiber optic cable 52 to the leading end of the push rod assembly 38 and withdrawing the push rod assembly 38 from the first end 58 of the conduit 60, the end of the fiber optic cable 52 is attached to the trailing end of the push rod assembly 38 and the push rod assembly 38 is withdrawn from the second end 70 of the conduit 60, thereby causing the fiber optic cable 52 to enter the first end 58 of the conduit 60, and to pass through the vertical potion 62, the elbow 64, the horizontal portion 66, the elbow 68 and the vertical portion 72 so that it exits the second end 70 of the conduit 60.

In an exemplary embodiment, before or during the insertion of the fiber optic cable 52 through the conduit 60 in one or more of the manners described above, a rope (not shown) is attached to the push rod assembly 38 after the push rod assembly 38 has exited the second end 70 of the conduit 60, which rope is then pulled back through the conduit 60 and to the streetlight 54 using the push rod assembly 38. If the rope is able to be pulled back to the streetlight 54 successfully, that is, without the rope causing any interference and/or damage to the conductors 14 in the conduit 60, then the ability to pull the fiber optic cable 52 through the conduit 60 in at least one or more of the manners described above is verified. As a result, the conduit 60 is "proofed." In an exemplary embodiment, after the conduit 60 has been "proofed" and the rope is still disposed in the conduit 60, instead of attaching the end of the fiber optic cable 52 to the leading or trailing end of the push rod assembly 38, the fiber optic cable 52 is attached to an end of the rope disposed in the conduit 60, and the rope is pulled out of the conduit 60 to thereby pull the fiber optic cable 52 through the conduit 60 so that the fiber optic cable 52 is disposed, and extends, within the conduit 60. In an exemplary embodiment, the rope is, or includes, jet line. In an exemplary embodiment, the rope is, or includes, mule tape. In an exemplary embodiment, the rope is, or includes, flat, braided rope. In an exemplary embodiment, the rope is, or includes, 12-strand rope, solid braid nylon rope, diamond braid rope, double braid rope, twisted 3-strand rope, and/or any combination thereof.

In an exemplary embodiment, after the fiber optic cable 52 is pulled through the conduit 60, the fiber optic cable 52 is then pulled through conduit 76, which is adjacent the conduit 60 and also extends in the davit of the streetlight 56, in a manner substantially similar to one or more of the above-described manners by which the fiber optic cable 52 is pulled through the conduit 60.

The above-described procedure is continued until the fiber optic cable 52 extends in the conduit running between adjacent streetlights and/or signal lights as desired.

Figure 5:
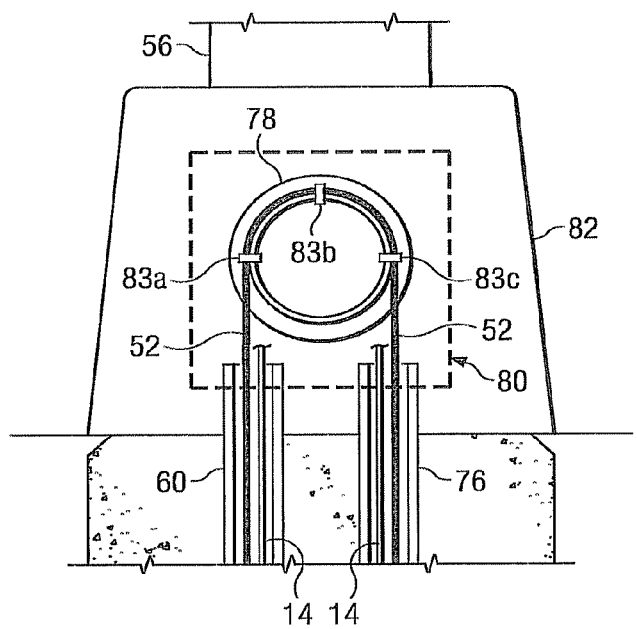
FIG. 5 is a schematic view of a strain relief ring for preventing kinking and preserving the static bending radius limits of fiber optic cable.
Figure 5A:
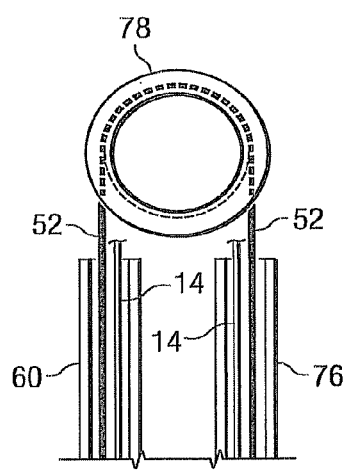
FIG. 5A is a front elevation schematic view of the strain relief ring shown in FIG. 5.
Figure 5B:
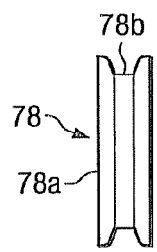
FIG. 5B is a side elevation schematic view of the strain relief ring shown in FIG. 5.

In an exemplary embodiment, as illustrated in FIGS. 5, 5A and 5B with continuing reference to FIGS. 1, 2, 3, 3A, 3B, 4, 4A and 4B, a strain relief ring 78 is disposed within a region 80 defined by a davit 82 of the streetlight 56. The conduit 60 and the conduit 76 adjacent thereto each extend into the region 80. The fiber optic cable 52 extends out of the conduit 60, over the ring 78, and into the conduit 76. The fiber optic cable 52 is coupled to the ring 78. In an exemplary embodiment, the fiber optic cable 52 is coupled to ring 78 via zip ties 83a, 83b and 83c, which are positioned at three circumferentially-spaced locations along the ring 78. In an exemplary embodiment, the ring 78 sits in the region 80. In an exemplary embodiment, the ring 78 is coupled to the davit 82. As shown in FIG. 5B, the ring 78 includes an annular member 78a and a circumferentially-extending channel 78b formed therein. The fiber optic cable 52 extends within the channel 78b so that the opposing walls of the annular member 78a defined by the channel 78 maintain the engagement between the fiber optic cable 52 and the ring 78. In operation, the ring 78 prevents the fiber optic cable 52 from being pulled down into the conduit 60 and/or 76 due to, for example, any accident and/or damage as a result of repairs on the streetlight conductors 14. Moreover, the ring 78 preserves the static bending radius limits of the fiber optic cable 52, ensuring that the fiber optic cable 52 does not crack or break as a result of its extension between the conduits 60 and 76.

Figure 6:
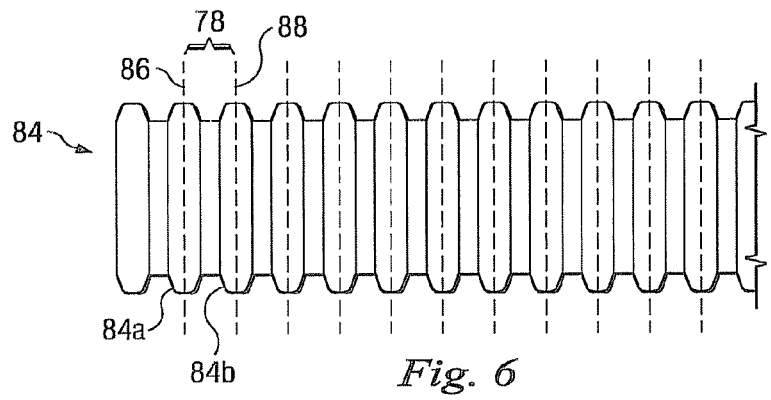
FIG. 6 is a side elevational view of a pipe used in the manufacture of the strain relief ring shown in FIG. 5.

In an exemplary embodiment, as illustrated in FIG. 6 with continuing reference to FIGS. 1, 2, 3, 3A, 3B, 4, 4A, 4B, 5, 5A and 5B, to manufacture the ring 78, a corrugated pipe 84 is provided. Cuts 86 and 88 are made through adjacent ridges 84a and 84b of the pipe 84, thereby forming the ring 78. In an exemplary embodiment, the pipe 84 has a diameter of 10 inches. In an exemplary embodiment, the pipe 84 is hollow, 10 in. corrugated drain pipe.

Figure 7:
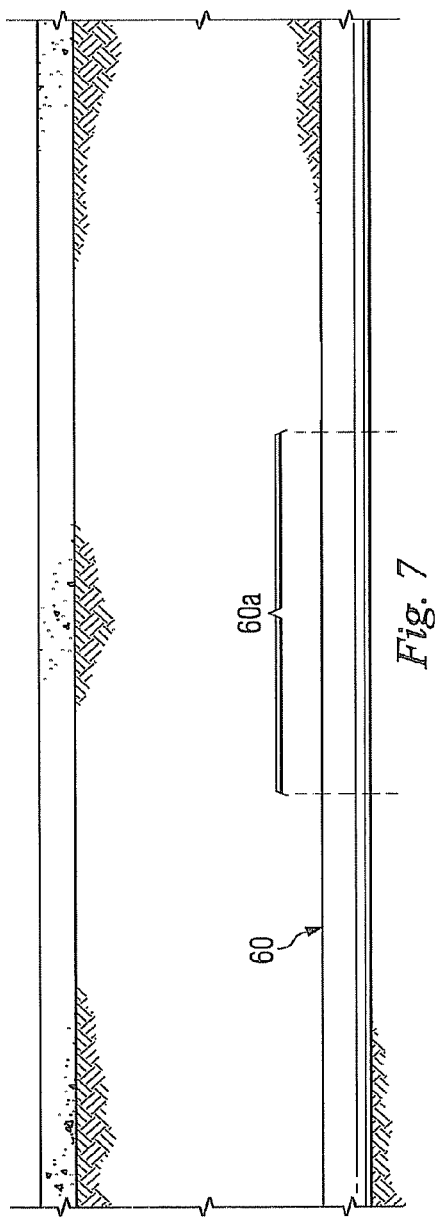
FIGS. 7 and 8 are schematic views of an intercept junction for facilitating, for example, a fiber optic cable drop, or the connection of two ends of fiber optic cable that run in separate conduit.
Figure 8:
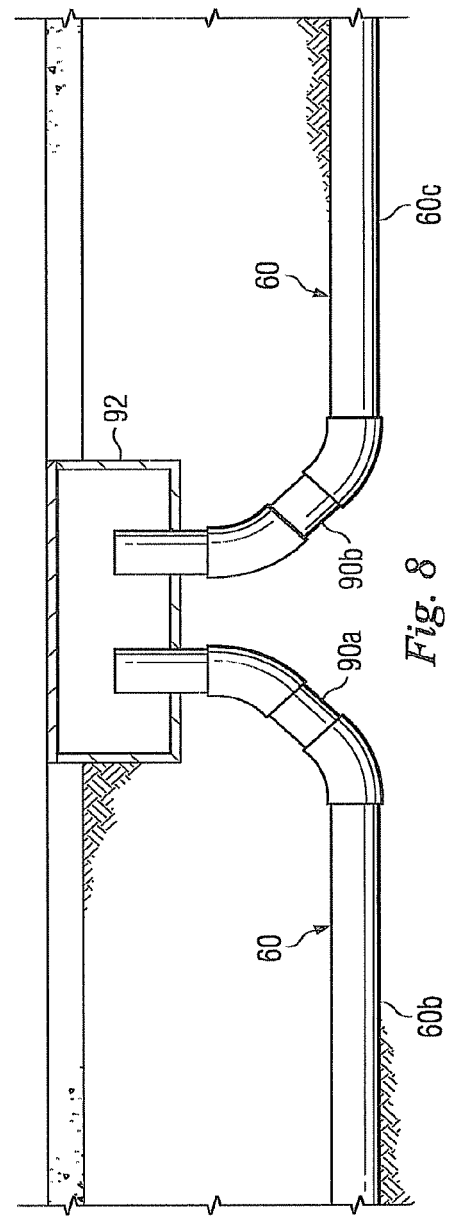

In an exemplary embodiment, as illustrated in FIGS. 7 and 8 with continuing reference to FIGS. 1, 2, 3, 3A, 3B, 4, 4A, 4B, 5, 5A, 5B and 6, to enable access to the conduit 60 between, for example, streetlights 54 and 56, the conduit 60 is excavated, a section 60a (shown in FIG. 7) of the conduit 60 is cut out, thereby defining remaining sections 60b and 60c of the conduit 60. As shown in FIG. 8, elbows 90a and 90b are coupled to ends of the conduit sections 60b and 60c, respectively, and a pull box 92 is installed in the excavation. In an exemplary embodiment, before, during or after the section 60a of the conduit 60 is cut out, existing conductors within the conduit 60 are removed from one direction. In an exemplary embodiment, before, during or after the section 60a is cut out, the conductors are decoupled from the streetlight 54 or 56 positioned closest to the excavation location, after which the section 60a is lifted upwards to provide space for the installation of the pull box 92 in the excavation. Since the conductors are decoupled from the streetlight 54 or 56 positioned closest to the excavation location, the conductors move through and out of the respective section 60b or 60c in response to the lifting of the section 60a, thereby permitting the both of the elbows 90a and 90b to be coupled to the sections 60b and 60c, respectively. In an exemplary embodiment, immediately after the conductors are decoupled from the streetlight 54 or 56 positioned closest to the excavation location, a line is coupled to the free end of the conductors so that the line moves with the conductors through and out of the respective section 60b or 60c in response to the lifting of the section 60a, at which point, in an exemplary embodiment, the free end of the conductors are decoupled from the line, which line remains disposed in the respective section 60b or 60c. After the pull box 92 is installed, the free end of the conductors are again coupled to the line disposed in the respective section 60b or 60c, and the line is pulled so that the free end of the conductors is pulled back to the street light 54 or 56, at which point the conductors are again coupled to the streetlight 54 or 56.

In operation, with continuing reference to FIG. 8, in an exemplary embodiment, the fiber optic cable 52 extends through the conduit section 60b, the pull box 92, and the conduit section 60c. A fiber optic drop cable from, for example, a facility and/or intersection, extends into the pull box 92 and is coupled to the fiber optic cable 52, thereby intercepting the fiber optic cable 52. In an exemplary embodiment, the ring 78 is disposed in the pull box 92, and the fiber optic cable 52 is coupled to the ring 78 in the manner described above.

In an exemplary embodiment, in operation, with continuing reference to FIGS. 1, 2, 3, 3A, 3B, 4, 4A, 4B, 5, 5A, 5B, 6, 7 and 8, the arrangement depicted in FIG. 8 is employed when the streetlight circuit including the streetlights 54 and 56 ends in order to, for example, extend the fiber optic cable 52 to another streetlight circuit, a signal light circuit, and/or a combination thereof.

Figure 9:
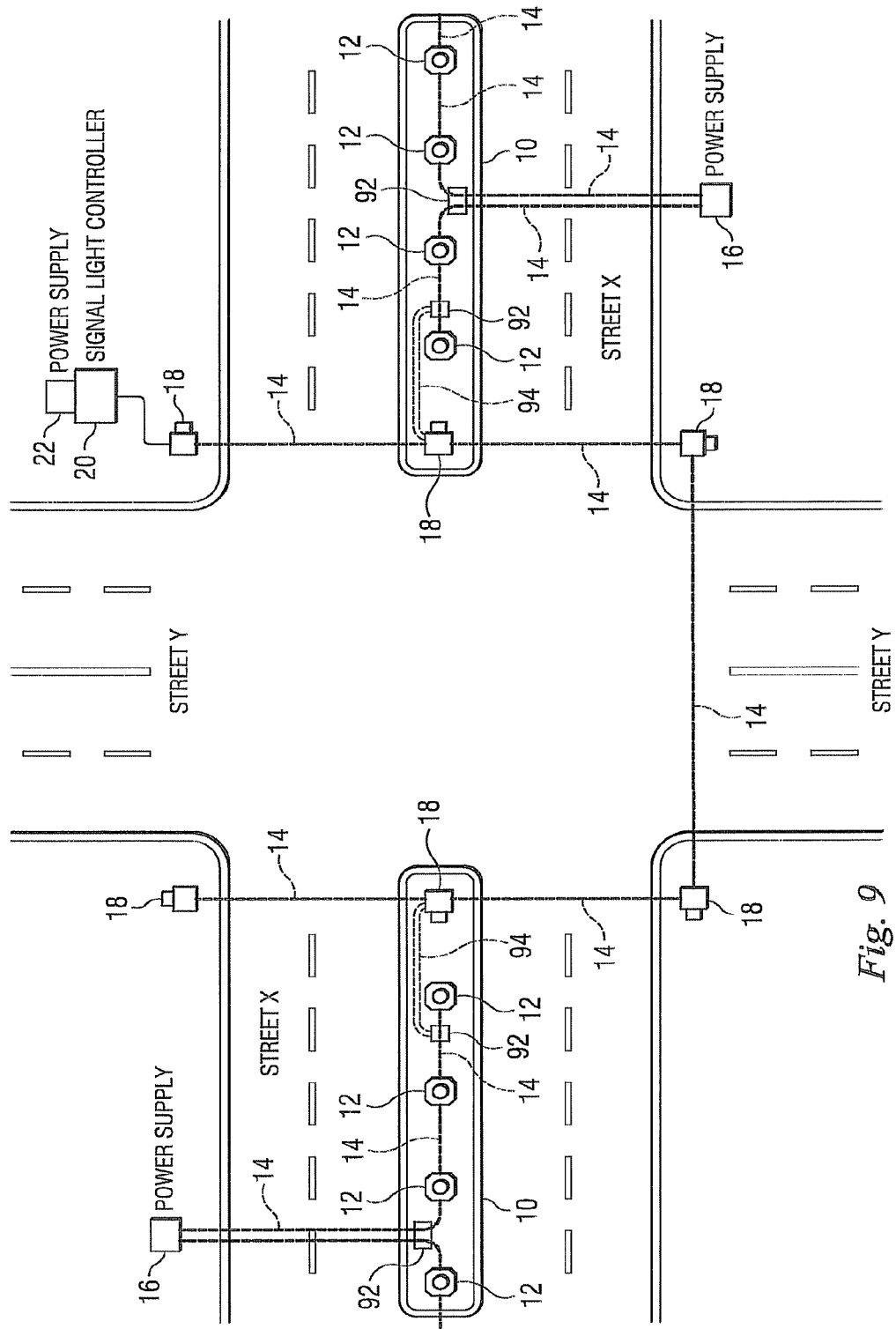
FIG. 9 is a view substantially identical to FIG. 2 and depicting two medians, each of which includes the intercept junction of FIG. 7 installed therein.

In an exemplary embodiment, in operation, as illustrated in FIG. 9 with continuing reference to FIGS. 1, 2, 3, 3A, 3B, 4, 4A, 4B, 5, 5A, 5B, 6, 7 and 8, the pull box 92 is installed in the median 10 between adjacent streetlights 12 in the manner described above, with one of the adjacent streetlights 12 being positioned at the end of its corresponding streetlight circuit. The fiber optic cable 52 (not shown in FIG. 9) extends out of the respective conduit section 60b (FIG. 8), but does not enter the respective conduit section 60c. Instead, a relatively short trench 94 extends from the pull box 92 to an existing signal light hand hole for the proximate traffic signals 18, a conduit (not shown in FIG. 9) is disposed in the trench 94, and the fiber optic cable 52 runs from the respective conduit section 60b, through the conduit disposed in the trench 94, and to the existing signal light hand hole for the proximate traffic signals 18. In contrast to the fiber optic cable 52, the conductors in the respective conduit section 60b extend into the respective conduit section 60c and to the streetlight 12 being positioned at the end of its corresponding streetlight circuit. As a result, the pull box 92 and the relatively short trench 94, inter alia, enable the fiber optic cable 52 to be run beyond the end of the corresponding streetlight circuit of which the conductors disposed in the conduit 60 are a part.

In several exemplary embodiments, the fiber splices in, for example, the fiber optic cable 52, are in a loop back configuration.

A method has been described that includes extending at least one conductor between first and second devices, each of the first and second devices comprising at least one of a streetlight and a signal light; extending the at least one conductor through a conduit; and extending a fiber optic cable through the conduit through which the at least one conductor extends to thereby install the fiber optic cable at least between the first and second devices. In an exemplary embodiment, extending the fiber optic cable through the conduit comprises disposing at least a portion of a rod assembly in the conduit; engaging a tool with the at least a portion of the rod assembly when the at least a portion of the rod assembly is disposed in the conduit; and withdrawing the tool from the conduit to thereby withdraw the at least a portion of the rod assembly from the conduit. In an exemplary embodiment, the conduit comprises first and second end portions; wherein the rod assembly comprises a third end portion; wherein the tool comprises a fourth end portion; wherein disposing the at least a portion of the rod assembly into the conduit comprises inserting the third end portion of the rod assembly into the first end portion of the conduit; wherein engaging the tool with the at least a portion of the rod assembly when the at least a portion of the rod assembly is disposed in the conduit comprises inserting the fourth end portion of the tool into the second end portion of the conduit; and engaging the fourth end portion of the tool with the third end portion of the rod assembly; and wherein withdrawing the tool from the conduit to thereby withdraw the at least a portion of the rod assembly comprises withdrawing the fourth end portion of the tool from the second end portion of the conduit to thereby withdraw the third end portion of the rod assembly from the second end portion of the conduit. In an exemplary embodiment, extending the fiber optic cable through the conduit further comprises coupling the fiber optic cable to the rod assembly; and withdrawing the rod assembly from the first end portion of the conduit to cause at least a portion of the fiber optic cable to enter the second end portion of the conduit, pass through the conduit, and exit the first end portion of the conduit. In an exemplary embodiment, the rod assembly comprises a first rod; and a line connected to the first rod, the line having a bunched end at the third end portion of the rod assembly; wherein the tool comprises a second rod; and at least one hook connected to the rod at the fourth end portion of the tool; and wherein engaging the fourth end portion of the tool with the third end portion of the rod assembly comprises engaging the at least one hook of the tool with the bunched end of the line of the rod assembly. In an exemplary embodiment, extending the fiber optic cable through the conduit further comprises coupling a rope to the rod assembly; and withdrawing the rod assembly from the first end portion of the conduit to cause at least a portion of the rope to enter the second end portion of the conduit, pass through the conduit, and exit the first end portion of the conduit, thereby verifying that at least a portion of the fiber optic cable is able to enter the second end portion of the conduit, pass through the conduit, and exit the first end portion of the conduit; coupling the fiber optic cable to the rope; and withdrawing the rope from the first end portion of the conduit to cause the at least a portion of the fiber optic cable to enter the second end portion of the conduit, pass through the conduit, and exit the first end portion of the conduit. In an exemplary embodiment, the rod assembly comprises a first rod; and a line connected to the first rod, the line having a bunched end at the third end portion of the rod assembly; wherein the tool comprises a second rod; and at least one hook connected to the rod at the fourth end portion of the tool; and wherein engaging the fourth end portion of the tool with the third end portion of the rod assembly comprises engaging the at least one hook of the tool with the bunched end of the line of the rod assembly. In an exemplary embodiment, the method includes extending the fiber optic cable through another conduit; wherein at least one of the first and second devices comprises a pole; a davit from which the pole extends, the davit defining a region, at least a portion of the davit being located above ground level; a strain relief ring disposed within the region defined by the davit; and a base on which the davit is mounted; wherein at least respective portions of the conduits are located below ground level; and wherein the fiber optic cable has a static bending radius, extends out of the first-mentioned conduit and into the region defined by the davit, extends over, and is coupled to, the strain relief ring so that relative movement between the fiber optic cable and the strain relief ring is resisted and so that the static bending radius of the fiber optic cable is preserved, and extends out of the region defined by the davit and into the another conduit.

A system has been described that includes means for extending at least one conductor between first and second devices, each of the first and second devices comprising at least one of a streetlight and a signal light; means for extending the at least one conductor through a conduit; and means for extending a fiber optic cable through the conduit through which the at least one conductor extends to thereby install the fiber optic cable at least between the first and second devices. In an exemplary embodiment, means for extending the fiber optic cable through the conduit comprises means for disposing at least a portion of a rod assembly in the conduit; means for engaging a tool with the at least a portion of the rod assembly when the at least a portion of the rod assembly is disposed in the conduit; and means for withdrawing the tool from the conduit to thereby withdraw the at least a portion of the rod assembly from the conduit. In an exemplary embodiment, the conduit comprises first and second end portions; wherein the rod assembly comprises a third end portion; wherein the tool comprises a fourth end portion; wherein means for disposing the at least a portion of the rod assembly into the conduit comprises means for inserting the third end portion of the rod assembly into the first end portion of the conduit; wherein means for engaging the tool with the at least a portion of the rod assembly when the at least a portion of the rod assembly is disposed in the conduit comprises means for inserting the fourth end portion of the tool into the second end portion of the conduit; and means for engaging the fourth end portion of the tool with the third end portion of the rod assembly; and wherein means for withdrawing the tool from the conduit to thereby withdraw the at least a portion of the rod assembly comprises means for withdrawing the fourth end portion of the tool from the second end portion of the conduit to thereby withdraw the third end portion of the rod assembly from the second end portion of the conduit. In an exemplary embodiment, means for extending the fiber optic cable through the conduit further comprises means for coupling the fiber optic cable to the rod assembly; and means for withdrawing the rod assembly from the first end portion of the conduit to cause at least a portion of the fiber optic cable to enter the second end portion of the conduit, pass through the conduit, and exit the first end portion of the conduit. In an exemplary embodiment, the rod assembly comprises a first rod; and a line connected to the first rod, the line having a bunched end at the third end portion of the rod assembly; wherein the tool comprises a second rod; and at least one hook connected to the rod at the fourth end portion of the tool; and wherein means for engaging the fourth end portion of the tool with the third end portion of the rod assembly comprises means for engaging the at least one hook of the tool with the bunched end of the line of the rod assembly. In an exemplary embodiment, means for extending the fiber optic cable through the conduit further comprises means for coupling a rope to the rod assembly; and means for withdrawing the rod assembly from the first end portion of the conduit to cause at least a portion of the rope to enter the second end portion of the conduit, pass through the conduit, and exit the first end portion of the conduit, thereby verifying that at least a portion of the fiber optic cable is able to enter the second end portion of the conduit, pass through the conduit, and exit the first end portion of the conduit; means for coupling the fiber optic cable to the rope; and means for withdrawing the rope from the first end portion of the conduit to cause the at least a portion of the fiber optic cable to enter the second end portion of the conduit, pass through the conduit, and exit the first end portion of the conduit. In an exemplary embodiment, the rod assembly comprises a first rod; and a line connected to the first rod, the line having a bunched end at the third end portion of the rod assembly; wherein the tool comprises a second rod; and at least one hook connected to the rod at the fourth end portion of the tool; and wherein means for engaging the fourth end portion of the tool with the third end portion of the rod assembly comprises means for engaging the at least one hook of the tool with the bunched end of the line of the rod assembly. In an exemplary embodiment, the system comprises means for extending the fiber optic cable through another conduit; wherein at least one of the first and second devices comprises a pole; a davit from which the pole extends, the davit defining a region, at least a portion of the davit being located above ground level; a strain relief ring disposed within the region defined by the davit; and a base on which the davit is mounted; wherein at least respective portions of the conduits are located below ground level; and wherein the fiber optic cable has a static bending radius, extends out of the first-mentioned conduit and into the region defined by the davit, extends over, and is coupled to, the strain relief ring so that relative movement between the fiber optic cable and the strain relief ring is resisted and so that the static bending radius of the fiber optic cable is preserved, and extends out of the region defined by the davit and into the another conduit.

A system has been described that includes a first device comprising at least one of a streetlight and a signal light; at least one conductor electrically coupled to the first device; a first conduit through which the at least one conductor extends, the first conduit comprising first and second end portions; and a fiber optic cable extending through the first conduit. In an exemplary embodiment, the system comprises a rod assembly, at least a portion of which is insertable into the first end portion of the first conduit and withdrawable from the second end portion of the first conduit, the rod assembly comprising a third end portion; and a tool insertable into, and withdrawable from, the second end portion of the first conduit, the tool comprising a fourth end portion engageable with the third end portion of the rod assembly so that, when the tool is withdrawn from the second end portion of the first conduit, the at least a portion of the rod assembly is withdrawn from the second end portion of the first conduit. In an exemplary embodiment, the rod assembly comprises a first rod; and a line connected to the first rod, the line having a bunched end at the third end portion of the rod assembly; and wherein the tool comprises a second rod; and at least one hook connected to the rod at the fourth end portion of the tool. In an exemplary embodiment, the system comprises a second conduit through which the fiber optic cable extends; and a second device comprising at least one of a streetlight and a signal light; wherein the at least one conductor is electrically coupled to the second device; wherein at least one of the first and second devices comprises a pole; a davit from which the pole extends, the davit defining a region; and a strain relief ring disposed within the region defined by the davit; and wherein the fiber optic cable has a static bending radius, extends out of the first conduit and into the region defined by the davit, extends over, and is coupled to, the strain relief ring so that relative movement between the fiber optic cable and the strain relief ring is resisted and so that the static bending radius of the fiber optic cable is preserved, and extends out of the region defined by the davit and into the second conduit. In an exemplary embodiment, the at least one of the first and second devices further comprises a base on which the davit is mounted; wherein at least a portion of the davit is located above ground level; and wherein at least respective portions of the first and second conduits are located below ground level. In an exemplary embodiment, the system comprises a rod assembly, at least a portion of which is insertable into the first end portion of the first conduit and withdrawable from the second end portion of the first conduit, the rod assembly comprising a third end portion; a first rod; and a line connected to the first rod, the line having a bunched end at the third end portion of the rod assembly; a tool insertable into, and withdrawable from, the second end portion of the first conduit, the tool comprising a fourth end portion engageable with the third end portion of the rod assembly so that, when the tool is withdrawn from the second end portion of the first conduit, the at least a portion of the rod assembly is withdrawn from the second end portion of the first conduit; a second rod; and at least one hook connected to the rod at the fourth end portion of the tool.

A method has been described that includes providing a streetlight system, the streetlight system comprising at least one streetlight; a conduit engaged with the streetlight; and one or more conductors disposed in the conduit; and installing fiber optic cable in the conduit. A system has been described that includes means for providing a streetlight system, the streetlight system comprising at least one streetlight; a conduit engaged with the streetlight; and one or more conductors disposed in the conduit; and means for installing fiber optic cable in the conduit. A method has been described that includes electrically coupling at least two devices, comprising extending one or more conductors between the two devices, the two devices and the one or more conductors forming at least part of a circuit; disposing the one or more conductors in a conduit; and disposing cable in the conduit, wherein the cable is not a part of the circuit. In an exemplary embodiment, each of the two devices comprises at least one of a streetlight and a signal light; and wherein the cable comprises fiber optic cable. A system has been described that includes means for electrically coupling at least two devices, comprising extending one or more conductors between the two devices, the two devices and the one or more conductors forming at least part of a circuit; means for disposing the one or more conductors in a conduit; and means for disposing cable in the conduit, wherein the cable is not a part of the circuit. In an exemplary embodiment, each of the two devices comprises at least one of a streetlight and a signal light; and wherein the cable comprises fiber optic cable. A system has been described that includes at least one device; one or more conductors electrically coupled to the device; a conduit in which the one or more conductors are disposed; and a cable disposed in the conduit. In an exemplary embodiment, the device comprises at least one of a streetlight and a signal light; and wherein the cable comprises fiber optic cable. A method has been described that includes installing a fiber optic cable in conduit in which one or more conductors are disposed, the one or more conductors forming a part of a circuit, the circuit comprising at least one of a streetlight and a signal light; wherein installing the fiber optic cable in the conduit comprises pulling at least a portion of the fiber optic cable through the conduit. A system has been described that includes means for installing a fiber optic cable in conduit in which one or more conductors are disposed, the one or more conductors forming a part of a circuit, the circuit comprising at least one of a streetlight and a signal light; wherein means for installing the fiber optic cable in the conduit comprises means for pulling at least a portion of the fiber optic cable through the conduit.

It is understood that variations may be made in the foregoing without departing from the scope of the disclosure. For example, instead of, or in addition to installing fiber optic cable, one or more of the above-described systems, devices and/or methods, and/or any combination thereof, may be employed to install other types of cable or line, and/or employed in other applications, operations, and/or environments, such as, for example, any environment utilizing a line through a conduit, bore or passage. Furthermore, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with anyone or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

The foregoing has outlined features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A fiber optic installation system and a conduit extending from a first device comprising at least one of a street light and a signal light, the conduit containing a conductor that is electrically coupled to the first device, the conduit having first and second end portions, comprising:
   a) a rod assembly located in the conduit and extending from the conduit first end portion, the rod assembly insertable into and withdrawable from the conduit first end portion, the rod assembly comprising a third end portion located in the conduit;
   b) a tool located in the conduit and extending from the conduit second end portion, the tool insertable into and withdrawable from the conduit second end portion, the tool comprising a fourth end portion located in the conduit and engageable with the rod assembly third end portion so that when either the rod assembly or the tool is withdrawn from the conduit, the other of the tool or the rod assembly will follow and be withdrawn from the conduit;
   c) a fiber optic cable coupled to one of the rod assembly or the tool, wherein the fiber optic cable can be extended through the conduit by withdrawing the other of the tool or the rod assembly.

2. The fiber optic installation system of claim 1 wherein the first and second end portions of the conduit each comprise a bent portion.

3. The fiber optic installation system of claim 1 wherein the third end portion comprises at least one loop and the fourth end portion comprises a hook.

4. A fiber optic installation system and a conduit extending from a first device comprising at least one of a street light and a signal ljght conduit containing a conductor that is electrically coupled to the first device, the conduit having first and second end portions, comprising:
   a) a rod assembly located in the conduit and extending from the conduit first end portion, the rod assembly insertable into and withdrawable from the conduit first end portion the rod assembly comprising a third end portion located in the conduit;
   b) a tool located in the conduit and extending from the conduit second end portion, the tool insertable into and withdrawable from the conduit second end portion, the tool comprising a fourth end portion located in the conduit and engageable with the rod assembly third end portion so that when either the rod assembly or the tool is withdrawn from the conduit, the other of the tool or the rod assembly will follow and be withdrawn from the conduit c) a fiber optic cable coupled to one of the rod assembly or the tool wherein the fiber optic cable can be extended through the conduit by withdrawing the other of the tool or the rod assembly;

d) the first device comprises a pole, a davit from which the pole extends, the davit defining a region, at least a portion of the davit being located above ground level, a strain relief ring disposed in the region defined by the davit and a base on which the davit is mounted;

e) the fiber optic cable has a static bending radius and extends out of the conduit, which is a first conduit and into the region defined by the davit, the fiber optic cable extends over and is coupled to, the strain relief ring so that relative movement between the fiber optic cable and the strain relief ring is resisted and so that the static bending radius of the fiber optic cable is preserved, and the fiber optic extends out of the region defined by the davit and into a second conduit extending from the first device.

5. An installed fiber optic system, comprising:

a) a device comprising at least one of a streetlight and a signal light;

b) a first conduit comprising first conduit first and second end portions, with the first conduit first end portion located at the device and the first conduit extending away from the device;

c) a second conduit comprising second conduit first and second end portions, with the second conduit first end portion located at the device and the second conduit extending away from the device;

d) a first conductor in the first conduit, which first conductor is electrically coupled to the device;

e) a second conductor in the second conduit, which second conductor is electrically coupled to the device;

f) a strain relief ring at the device;

g) a fiber optic cable located in the first conduit, around the ring and extending into the second conduit.

6. The installed fiber optic system of claim 5 wherein the ring is a segment of a corrugated pipe.

7. A system comprising:

a) a first device comprising at least one of a streetlight and a signal light, the first device comprising a base and a pole extending up from the base, the at least one of a street light and a signal light located on the pole;

b) at least one conductor electrically coupled to the first device;

c) a first conduit through which the at least one conductor extends, the first conduit comprising first and second end portions, the first conduit first end portion located in the base, the first conduit second end portion located remote from the base;

d) a second conduit comprising first and second end portions, the second conduit first end portion located in the base, the second conduit second end portion located remote from the base;

e) the at least one conductor is a first conductor, a second conductor extending through the second conduit;

f) an unbroken fiber optic cable extending through the first conduit, into the base and through the second conduit.

8. The system of claim 7, further comprising:

a) a rod assembly, at least a portion of which is insertable into the first end portion of the first conduit and withdrawable from the second end portion of the first conduit, the rod assembly comprising a third end portion; and b) a tool insertable into, and withdrawable from, the second end portion of the first conduit, the tool comprising a fourth end portion engageable with the third end portion of the rod assembly so that, when the tool is withdrawn from the second end portion of the first conduit, the at least a portion of the rod assembly is withdrawn from the second end portion of the first conduit.

9. The system of claim 8, wherein the rod assembly comprises:

a) a first rod; and b) a line connected to the first rod, the line having a bunched end at the third end portion of the rod assembly, wherein the tool comprises a second rod and at least one hook connected to the rod at the fourth end portion of the tool.

10. A system comprising:

a) a first device comprising at least one of a streetlight and a signal light;

b) at least one conductor electrically coupled to the first device;

c) a first conduit through which the at least one conductor extends, the first conduit comprising first and second end portions;

d) a fiber optic cable extending through the first conduit;

e) a second conduit through which the fiber optic cable extends; and f) a second device comprising at least one of a streetlight and a signal light; wherein the at least one conductor is electrically coupled to the second device; wherein at least one of the first and second devices comprises a pole, a davit from which the pole extends, the davit defining a region; and a strain relief ring disposed within the region defined by the davit; wherein the fiber optic cable has a static bending radius that extends out of the first conduit and into the region defined by the davit, extends over, and is coupled to, the strain relief ring so that relative movement between the fiber optic cable and the strain relief ring is resisted and so that the static bending radius of the fiber optic cable is preserved, and extends out of the region defined by the davit and into the second conduit.

11. The system of claim 10, wherein the at least one of the first and second devices further comprises a base on which the davit is mounted, wherein at least a portion of the davit is located above ground level; and wherein at least respective portions of the first and second conduits are located below ground level.

12. The system of claim 11, further comprising:

a) a rod assembly, at least a portion of which is insertable into the first end portion of the first conduit and withdrawable from the second end portion of the first conduit, the rod assembly comprising a third end portion, a first rod; and a line connected to the first rod, the line having a bunched end at the third end portion of the rod assembly;

b) a tool insertable into, and withdrawable from, the second end portion of the first conduit, the tool comprising a fourth end portion engageable with the third end portion of the rod assembly so that, when the tool is withdrawn from the second end portion of the first conduit, the at least a portion of the rod assembly is withdrawn from the second end portion of the first conduit; a second rod; and at least one hook connected to the rod at the fourth end portion of the tool.

13. The installed fiber optic system of claim 5 wherein the first conduit first end portion and the second conduit first end portion are each bent from a horizontal orientation extending toward the respective second end portions to a vertical orientation at the device.

\* \* \* \* \*